United States Patent Office 3,625,085
Patented Dec. 7, 1971

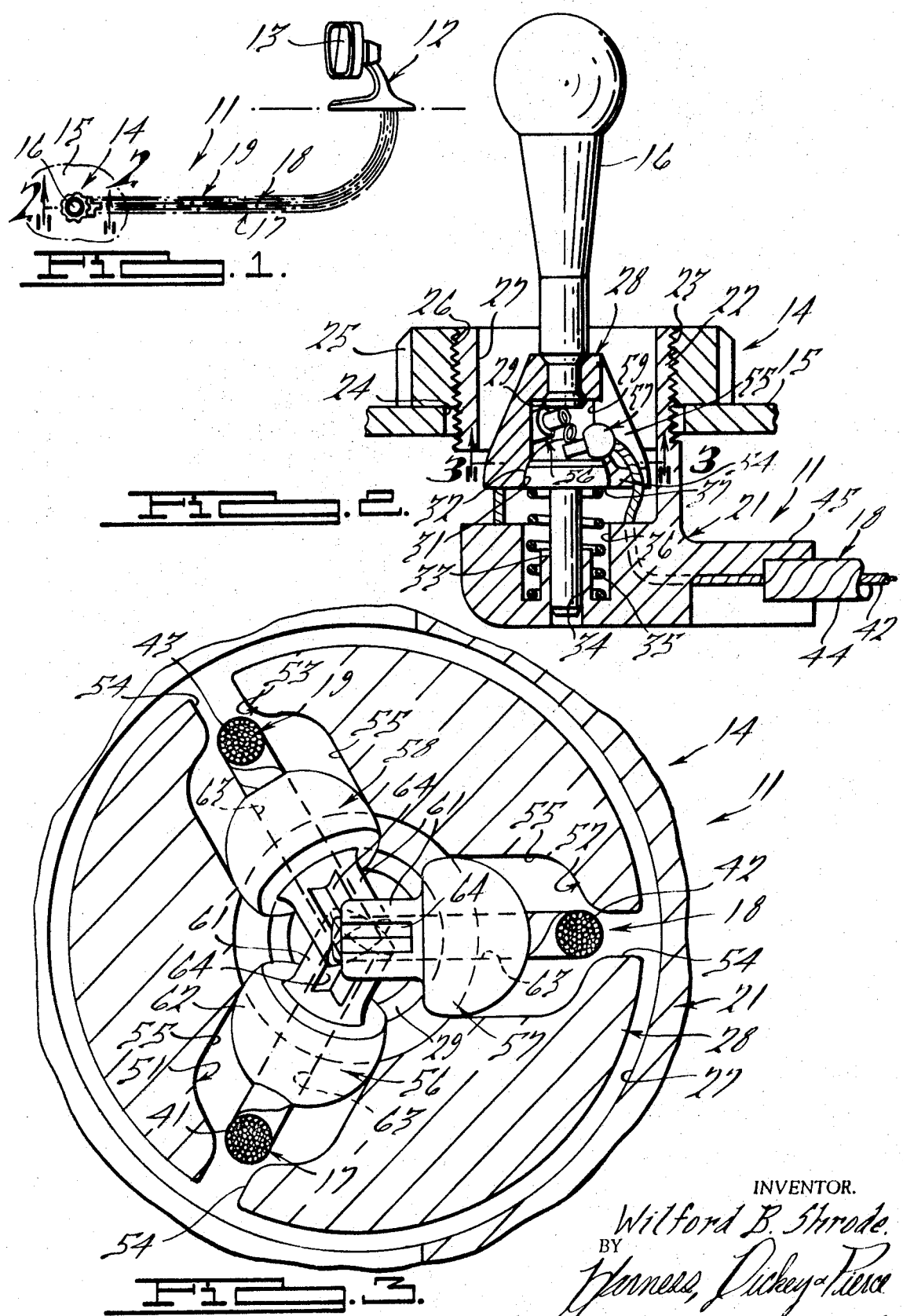

3,625,085
CONTROL FOR REMOTE CONTROLLED MIRROR
Wilford B. Shrode, Huntington Woods, Mich., assignor to Leader International Industries, Inc.
Filed Oct. 27, 1969, Ser. No. 869,802
Int. Cl. F16c 1/14
U.S. Cl. 74—501         7 Claims

ABSTRACT OF THE DISCLOSURE

A remote controlled mirror assembly wherein motion is transmitted from a control lever to a remotely positioned mirror by means of a plurality of flexible transmitters. An arrangement is provided for conveniently attaching the ends of the transmitters to the control lever and for preventing inadvertent displacement of the wire ends by means of an interference type relationship.

CROSS-REFERENCE TO RELATED APPLICATION

This application is an improvement upon my copending application entitled "Remote Control Mirror," Ser. No. 767,353, filed Oct. 14, 1968.

BACKGROUND OF THE INVENTION

This invention relates to a remote controlled mirror and more particularly to an improved arrangement for affixing the flexible wire transmitters relative to one member of a remote controlled device.

Remote controlled devices are well known and frequently embody one or more flexible wire actuators for transmitting movement from a control member to a controlled member. The remote controlled mirror shown in my aforenoted United States patent application is a typical example of such a device. Generally, the wire transmitters are fixed relative to at least one of the members by means of ferrules that are affixed at fixed linear points to the wire actuators and which are received in suitable openings in the member so as to hold the components in an assembled relationship. Under extreme operating conditions such as excessive movement of one of the members, it is possible that the wire will become disassociated from the associated member. Although a positive connection would cure this problem, the connecting of the elements together in a positive manner is expensive.

It is, therefore, a principal object of this invention to provide an improved remote control device.

It is another object of this invention to provide a remote control device embodying an improved and simplified manner of maintaining a plurality of wire actuators relative to a member of the system.

SUMMARY OF THE INVENTION

This invention is particularly adapted to be embodied in a remote control device comprised of a control member, a controlled member and a plurality of flexible transmitters for transmitting motion between the members. The invention comprises a means for affixing one end of the flexible transmitters relative to one of the members and for resisting disassembly of the transmitters from one member. This means comprises a plurality of openings formed in the one member, there being at least one such opening for each transmitter. Fastening means are fixed to each of the transmitters and the openings are sized to pass the transmitters and the fastening means when the transmitters and fastening means are individually passed through the openings. The fastening means and the member interfere with each other when all of the transmitters have been assembled to the one member for holding the transmitters against disassembly relative to one member.

BRIEF DESCRIPTION OF THE DRAWINGS

FIG. 1 is a side elevational view of a remote controlled outside, automotive rear view mirror embodying this invention.

FIG. 2 is an enlarged cross-sectional view taken along the line 2—2 of FIG. 1.

FIG. 3 is a further enlarged cross-sectional view taken along the line 3—3 of FIG. 2.

DETAILED DESCRIPTION OF THE PREFERRED EMBODIMENT

Referring first to FIG. 1, a remote controlled, outside, automotive rear view mirror assembly embodying this invention is identified generally by the reference numeral 11. The mirror assembly 11 includes a mirror head 12 that is adapted to be supported in any known manner on the exterior sheet metal of the associated vehicle. The mirror head 12 includes a mirror glass 13 and means for supporting the mirror glass 13 for universal pivotal movement. A control actuator, indicated generally by the reference numeral 14, is adapted to be mounted on a panel 15 of the interior of the car. The control actuator 14 includes a control lever 16, which is also supported for universal pivotal movement in a manner which will become more apparent as this description proceeds. A plurality of Bowden wire actuators 17, 18 and 19 interconnect the control actuator 14 with the mirror glass 13 for adjustment of the angle or position of the mirror glass.

Referring now in detail to the remaining figures, the control actuator is comprised of a supporting member, indicated generally by the reference numeral 21. The supporting member 21 may be formed as a zinc die casting, may be formed from plastic or may be made in any other suitable manner. The supporting member 21 has a generally cylindrical section 22 with male threads 23 formed at its outer end. The section 22 and threads 23 are adapted to be passed through a complementary opening 24 formed in the panel 15. A bezel 25 having female threads 26 is received upon the threads 23 and engages the panel 15. The bezel 25 holds the panel 15 against a shoulder (not shown) formed by the supporting member 21 to affix the supporting member 21 relative to the panel 15.

The supporting member section 22 is formed with a cylindrical opening 27 into which a portion of the control lever 16 extends. At its inner end, the control lever 16 is staked to a spider member 28, as at 29. The spider member 28 is formed with a socket cavity 31 that has a generally spherical shape. Received in the socket cavity 31 is a complementary surface 32 of a journal member. The journal member has a shank portion 33 that is slidably received in a bore 34 formed in a portion of the supporting member 21 at the base of the cylindrical section 22 and coaxial with it. A coil spring 35 encircles the shank portion 33 and engages an annular groove 36 formed in the supporting member 21 at one of its ends. The opposite end of the spring 35 bears against a shoulder 37 formed on the journal member between the portion 32 and shank 33 for urging the journal member away from the supporting member 21.

As described in my aforenoted copending patent application, the Bowden wire actuators 17, 18 and 19 are disposed in a substantially coplanar relationship adjacent the supporting member 21. Each of the wire actuators 41, 42, 43 has a protective sheath (only the sheath associated with the actuator 18 and wire 42 appears in the drawings and is identified generally by the reference numeral 44) that is affixed to a section 45 of the supporting member 21. In addition, as disclosed in that patent application, the supporting member 21 has guide surfaces that turn each of the wires 41, 42 and 43 through substantially a right angle so that the wires at their outer extremities extend substantially parallel to the shank 33 of the journal member. This invention relates to the manner in which these ends of the wires 41, 42 and 43 are affixed to the spider 28, which arrangement will now be described in detail.

The spider 28 is formed with openings 51, 52 and 53 which receive the ends of the wires 41, 42 and 43. Each of the openings 51, 52 and 53 is substantially the same shape and comprises a first section 54 that is relatively narrow and which extends through the lower face of the spider 28. The width of the section 54 is only just slightly larger than the diameter of the respective wires 41, 42 and 43 so that the wires will pass freely through the sections 54. At their upper extremities, the openings 51, 52 and 53 are formed with larger sized sections 55 which sections are adapted to receive ferrules 56, 57 and 58 that are fixed to the ends of the wires 41, 42 and 43, respectively. The sections 55 all extend into a generally cylindrical central opening 59 formed in the spider 28 adjacent the upset portion 29 of the control lever 16.

The ferrules 56, 57 and 58 all have substantially the same shape, which shape somewhat resembles a mushroom. This shape is comprised of a generally cylindrical section 61 that terminates adjacent an enlarged hemispherical section 62. A cylindrical bore 63 extends through both of the sections 61 and 62 and receives the respective ends of the wires 41, 42, and 43. The ferrules 56, 57 and 58 are fixed to the wires 41, 42 and 43 by crimping of the ferrule sections 61, as at 64.

Upon assembly, the wires are individually fed into the respective openings and in the described embodiment the wire 42 is first passed through the opening 51 with the wire section extending through the opening 54 and the ferrule received in the opening portion 55. The ferrule portion 61 extends across and into the spider opening 59. Next, the wire 43 is assembled into the spider 28 with the wire extending through the opening portion 53 and its ferrule 58 being disposed in the opening portion 55. Again, the ferrule portion 61 extends into the central opening 59 of the spider 28 and overlies the corresponding portion of the ferrule 56. Last, the wire 41 is put in place with the wire passing through the opening portion 54 and its ferrule 57 being disposed in the opening portion 55. Again, the portion 61 of the ferrule 57 extends into the spider opening 59 and overlies the corresponding portions of the ferrules 58 and 56. When the third wire is in position, the ferrules will be disposed so that they are closely adjacent the upset portion 59 of the lever 16. Hence, although the wires 41, 42 and 43 may be conveniently assembled to the control lever 16 and its spider 28, they cannot become inadvertently disassembled. The tension on the wires 41, 42 and 43 exerted by the spring 35 also assists in this holding action.

What is claimed is:

1. In a remote control device comprised of a control member, a controlled member and a plurality of flexible transmitters for transmitting motion between said members, the improvement comprising means for affixing one end of said flexible transmitters relative to one of said members and for resisting disassembly of said transmitters from said one member, said means comprising a plurality of openings in said one member, there being at least one said opening for each of said transmitters, and fastening means affixed to each of said transmitters, said openings being sized to pass said transmitters and said fastening means when said transmitters and said fastening means dividually passed through said openings, said fastening means and said one member interfering with each other only when all of said transmitters have been assembled to said one member for holding said transmitters against disassembly.

2. A remote control device as set forth in claim 1 wherein each of the openings has a first portion sized to pass the flexible transmitter and a second portion sized to pass the fastening means.

3. A remote control device as set forth in claim 2 wherein the first portion of the openings all extend through a common face of the one member.

4. A remote control device as set forth in claim 3 further including tensioning means for tensioning the transmitters.

5. A remote control device as set forth in claim 2 wherein the second portions of each of the openings merge into a common opening, the fastening means having a first portion received in the second portion of the openings and a second portion received in the common opening.

6. A remote control device as set forth in claim 1 wherein the control member comprises a control lever adapted to be positioned on the interior of a motor vehicle, the controlled member comprising a rear view mirror adapted to be supported on the exterior of the motor vehicle.

7. A remote control device as set forth in claim 6 wherein the one member comprises the control lever.

References Cited
UNITED STATES PATENTS

| | | | |
|---|---|---|---|
| 3,473,823 | 10/1969 | Liedel | 74—501 |
| 3,472,095 | 10/1969 | Kostin et al. | 74—501 |
| 3,444,754 | 5/1969 | Liedel | 74—501 |
| 3,286,545 | 11/1966 | Malachowski | 74—501 |
| 3,195,369 | 7/1965 | Warhol | 74—501 |
| 3,046,841 | 7/1962 | Kawecki | 74—501 |
| 3,046,840 | 7/1962 | Barcus | 74—501 |

WILLIAM F. O'DEA, Primary Examiner

T. R. HAMPSHIRE, Assistant Examiner

U.S. Cl.X.R.

74—501.5, 501 M

UNITED STATES PATENT OFFICE
CERTIFICATE OF CORRECTION

Patent No. 3625085            Dated December 7, 1971

Inventor(s) W. B. Shrode

It is certified that error appears in the above-identified patent and that said Letters Patent are hereby corrected as shown below:

Column 4, lines 10 and 11 (Claim No. 1), "said fastening means dividually" should be -- said fastening means are individually --.

Signed and sealed this 20th day of June 1972.

(SEAL)
Attest:

EDWARD M. FLETCHER, JR.　　　　　　　　ROBERT GOTTSCHALK
Attesting Officer　　　　　　　　　　　　Commissioner of Patents